United States Patent
Yoshimura et al.

[11] 3,717,445
[45] Feb. 20, 1973

[54] ELECTRODE HOLDER FOR ELECTRIC ARC FURNACE AND MAKE THE SAME

[75] Inventors: Tsuneo Yoshimura; Kunio Suzuki, Tokyo; Gohei Shikano, Chigasaki, all of Japan

[73] Assignees: Mitsubishi Seiko Kabushiki Kaisha; Toyo Carbon Kabushiki Kaisha, Tokyo

[22] Filed: Nov. 5, 1970

[21] Appl. No.: 87,086

[30] Foreign Application Priority Data

Nov. 12, 1969 Japan ..................... 44/90676
Oct. 13, 1970 Japan ..................... 45/89329
Oct. 13, 1970 Japan ..................... 45/89330

[52] U.S. Cl. ................. 29/182.3, 13/16, 75/208 R
[51] Int. Cl. ............................................ H05b 7/12
[58] Field of Search ....... 29/182.2, 182.3, 182.5, 182; 75/200, 201, 208, 214; 13/15, 16

[56] References Cited

UNITED STATES PATENTS 3,671,656  6/1972  Smith ........................... 13/16
3,535,093 10/1970  Sara ............................. 29/182.5
3,307,924  3/1967  Michael ....................... 29/182.5

FOREIGN PATENTS OR APPLICATIONS 1,185,414  3/1970  Great Britain ................. 13/16
  238,004  7/1959  Australia ....................... 75/201
    8,841  5/1966  Japan ........................... 75/201

*Primary Examiner*—Benjamin R. Padgett
*Assistant Examiner*—B. H. Hunt
*Attorney*—Bosworth, Sessions, Herrstrom & Cain

[57] ABSTRACT

An electrode holder having a powder metallurgical liner suitable for an application of an electric arc furnace using a high electric power as well as an ultra high electric power. The liner is fabricated from a porous powder metallurgical plate itself or the plates sintered on one side or both sides of a metal plate comprising at least one of metal powder selected from the group consisting of copper, iron and aluminum powders with or without graphite powder, an additional metal powder and if necessary, together with carbon fiber or graphite fiber.

6 Claims, 25 Drawing Figures

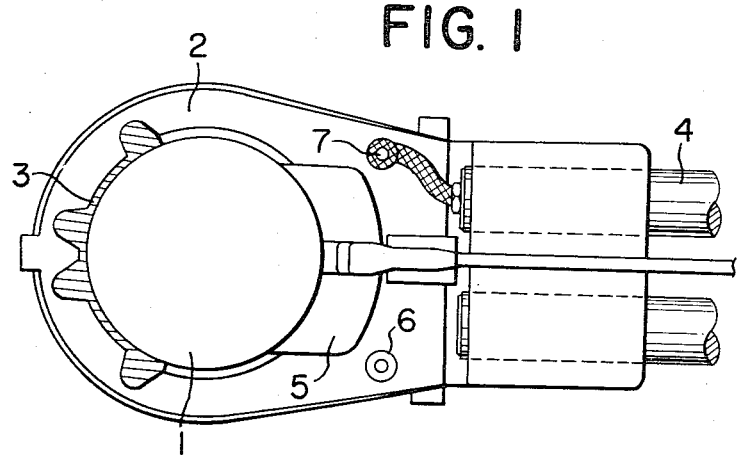
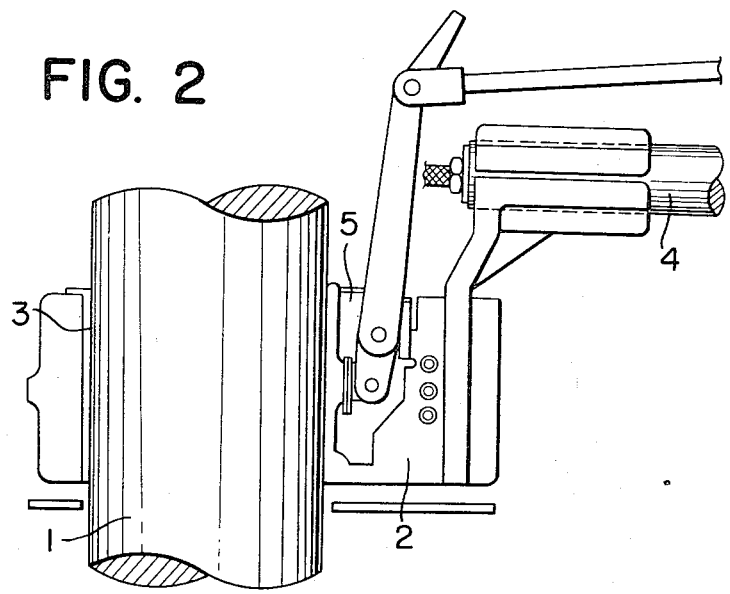

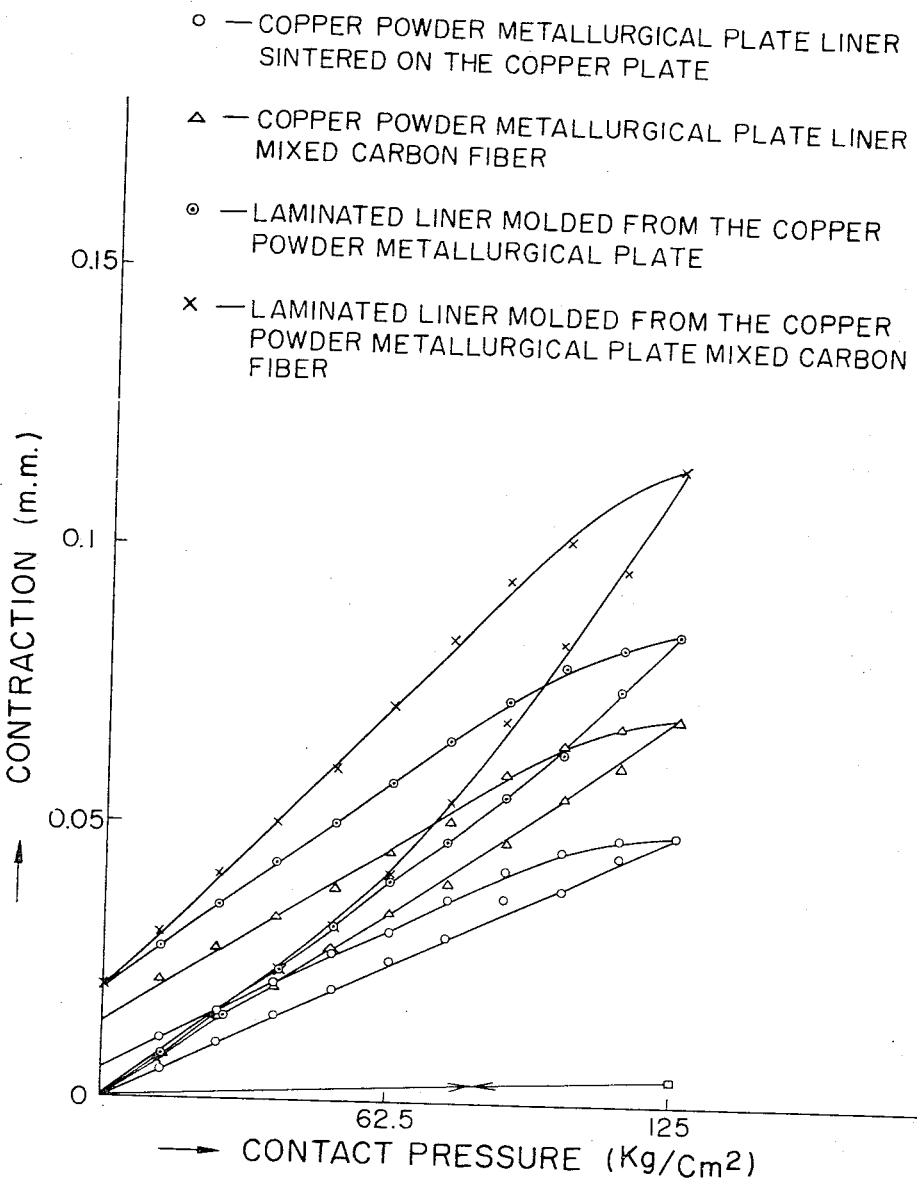

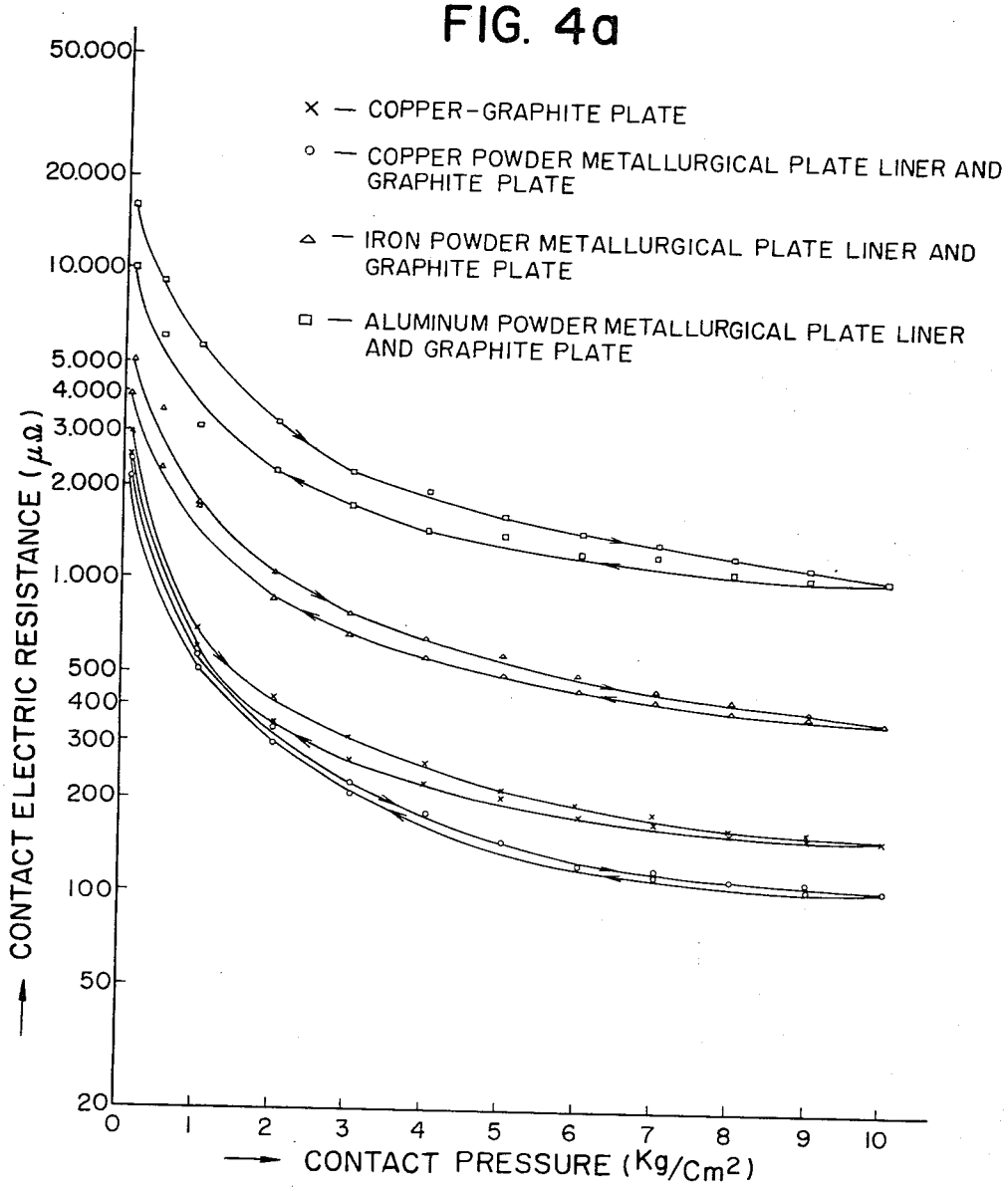

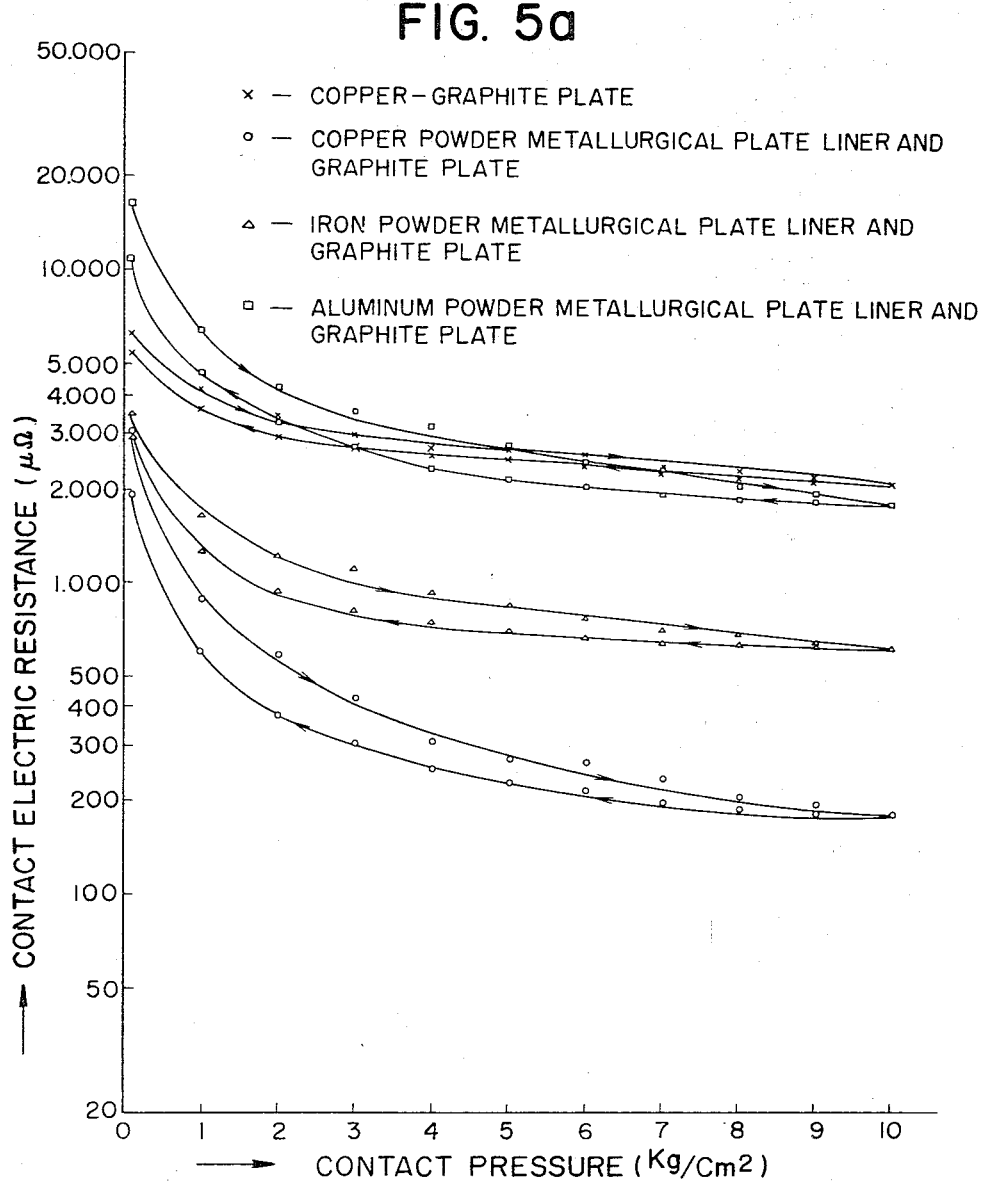

ELECTRODE HOLDER FOR ELECTRIC ARC FURNACE AND MAKE THE SAME

BACKGROUND OF THE INVENTION

The invention relates to an improved electrode holder liner suitable for a graphite electrode holder of the electric arc furnace, more particularly, this invention relates to the electrode holder having the porous powder metallurgical plate liner itself or those sintered on one side or both sides of a surface of the metal plate applicable to the electrode holder of the electric arc furnace.

Ordinary, it has been mainly used the electrode holder having such a structure as directly supporting the graphite electrode and supplying an electric current thereto.

However, a prior electrode holder mentioned above is easy to make a bad contact with the electrode by causing a deformation of the electrode holder itself owing to a heat hysteresis thereof during a use for long period thereby to bring a local high electric current density and said phenomena will be accelerated until the holder is damaged even if heat generated by a resistance at a contact surface of the electrode holder is effectively removed by flowing a cooling water through the electrode holder.

In such a structure of the electrode holder as mentioned above, a troublesome lying in spherical contact surface between the graphite electrode and the electrode holder results in a damage of the electrode holder until a repair becomes difficult.

In order to overcome many disadvantages as mentioned above, it has now been adopted a liner system interposed an copper plate liner between the graphite electrode and the electrode holder as shown in FIG. 1.

In the system mentioned above, although a cooling efficiency at the contact surface between the holder and the graphite electrode somewhat decreases, the bad contact between the holder and the graphite electrode may be improved thereby preventing the damage of the electrode holder. Namely the copper plate liner is able to remove at any time to polish by a grinder whereby the bad contact and a bad electric conductivity may be improved. When the copper plate liner becomes too thinner to polish, only the liner may be renewed and it makes cheaply and easily to repair.

Since in the structure of the furnace point of view the electric holder is heated by hot gas generated in the furnace and by the electric current therethrough, it is a natural matter that the copper plate liner is forced to maintain at a high temperature.

A thermal expansion coefficient of the copper plate liner differs from that of the graphite electrode as shown in Table 1 and the diameter of the electrode also somewhat differs from one another in the same number of an article as shown in Table 2, therefore, it is difficult to maintain a good contact in the contact surface between the holder and the graphite electrode.

TABLE 1

The coefficient of thermal expansion of graphite and copper

| | The coefficient of thermal expansion ×10⁻⁶/°C | | | Temp. °C |
|---|---|---|---|---|
| Graphite | 0.6 | 1.0 | 20 | 100°C |
| Copper | 16.6 | | | 20°C |

TABLE 2

The diameter of the graphite electrode (unit mm)

| The diameter of the electrode | The range of allowance according to JIS* R7201 | |
|---|---|---|
| So called diameter | Maximum diameter | Minimum diameter |
| 300 | 307 | 303 |
| 350 | 357 | 353 |
| 400 | 408 | 404 |
| 450 | 459 | 455 |
| 500 | 510 | 506 |
| 550 | 561 | 557 |

* JIS Japanese Industrial Standard

In the recent electric arc furnace operation, it intends to operate the electric arc furnace using a high electric power as well as an ultra high electric power to improve productivity. In such situation, since larger electric current as well as higher voltage are used in the operation, the more a current density will increase in the liner location. As mentioned above, it is impossible to always maintain so as to be a good contact between the graphite electrode and the liner of the holder. Therefore, the electric current will gather into the contact location thereof whereby abnormal local heating as well as a formation of copper oxide layer may occur. Since copper oxide formed makes poor electroconductivity as well as thermal conductivity, the temperature increasement may be accelerated until the copper plate liner reaches to the damage. In order to overcome said disadvantages, the copper plate liner periodically shall be polished every few days to remove the oxide layer thereby to protect from the local heating. According to an increasement of an operating electric power, a polishing cycle of the copper plate liner will increase and a duration time for operating one cycle will decrease. Therefore a number of working times will decrease and a maintenance cost will increase as the operating electric power increase.

In higher electric power operation (so called an ultra-high power operation or U.H.P. operation informally), 2 – 4 times of the electric current ordinally used, result in the increasement of the electric current density whereby the trouble-some is easy to occur.

Therefore, it has been often used in U.H.P. operating electric arc furnace such a structure of the holder liner as supply water through the liner itself to cool thereof and as clamp more than twice times of the clamping force ordinally used.

Such the structure of the electrode holder as shown above makes it easy to form a copper oxide layer which is an electric insulating material and to spark out.

In view of said matter, it was necessary to renew the liner every week.

SUMMARY OF THE INVENTION

The present invention provides a novel liner suitable for the graphite electrode holder overcoming many disadvantages and also improving the operating efficiency as well as the depression of the maintenance cost characterized in that it comprises the porous powder metallurgical plate itself, a laminated plate comprising two or more than two of the porous powder metallurgical plates having different components or those supported on a surface of the metal plate manufactured by 30 – 100 percent by weight of at least one of metal powder selected from the group consisting of copper, iron and aluminum powders as a main component of metal powder, 0 – 50 percent by weight of graphite powder, 0 – 30 percent by weight of the additional metal powder and 0 – 3 percent by weight of carbon fiber or graphite fiber on the weight basis of the powder metallurgical plate.

BRIEF DESCRIPTION OF THE DRAWING

FIG. 1 is a plan elevation of the liner type electrode holder;

FIG. 2 is a side view of the electrode holder of FIG. 1;

FIG. 3 is a characteristic curve showing a pressure-deformation of the copper powder metallurgical plate in comparison with that of the copper plate;

FIGS. 4a – 4c are the characteristic curves showing an interrelationship between a contact electric resistance and a contact pressure of the powder metallurgical plate of composition Nos. 2, 3 or 4; No. 7 and the laminated molding plate consisting plates of the compositions Nos. 1, 5 and 2 in order and the powder metallurgical plate of the composition Nos. 12, 13 or 14 (mixed with carbon fiber) of Table 3 respectively in comparison with those of the graphite plate measured in the room temperature;

FIGS. 5a – 5c are the characteristic curves showing the interrelationship between the contact electric resistance and the contact pressure of the liner of samples shown in FIGS. 4a – 4c treated by heat of 300° C. measured in an ambient temperature as well as a stationary operating condition;

FIGS. 6a – 11b are diagrammatical views of the powder metallurgical plate liner of this invention;

FIGS. 6a – 6b are a front view and a plan view of the liner of the powder metallurgical plate not providing any groove respectively;

FIG. 7b is a cross sectional view along a line c — c of FIG. 7a;

FIGS. 11a and 11b are a front view and a top view of the liner sintered on both sides of the metal plate 18 the powder metallurgical plates 19 respectively;

In FIG. 1, 1 is the graphite electrode; 2, the water cooled holder; 3, the copper plate liner; 4, bus tube for supplying electric current; 5, a press machine; 6, an inlet of a cooling water; 7, an outlet thereof.

DESCRIPTION OF THE PREFERRED EMBODIMENT

Figure 4B:
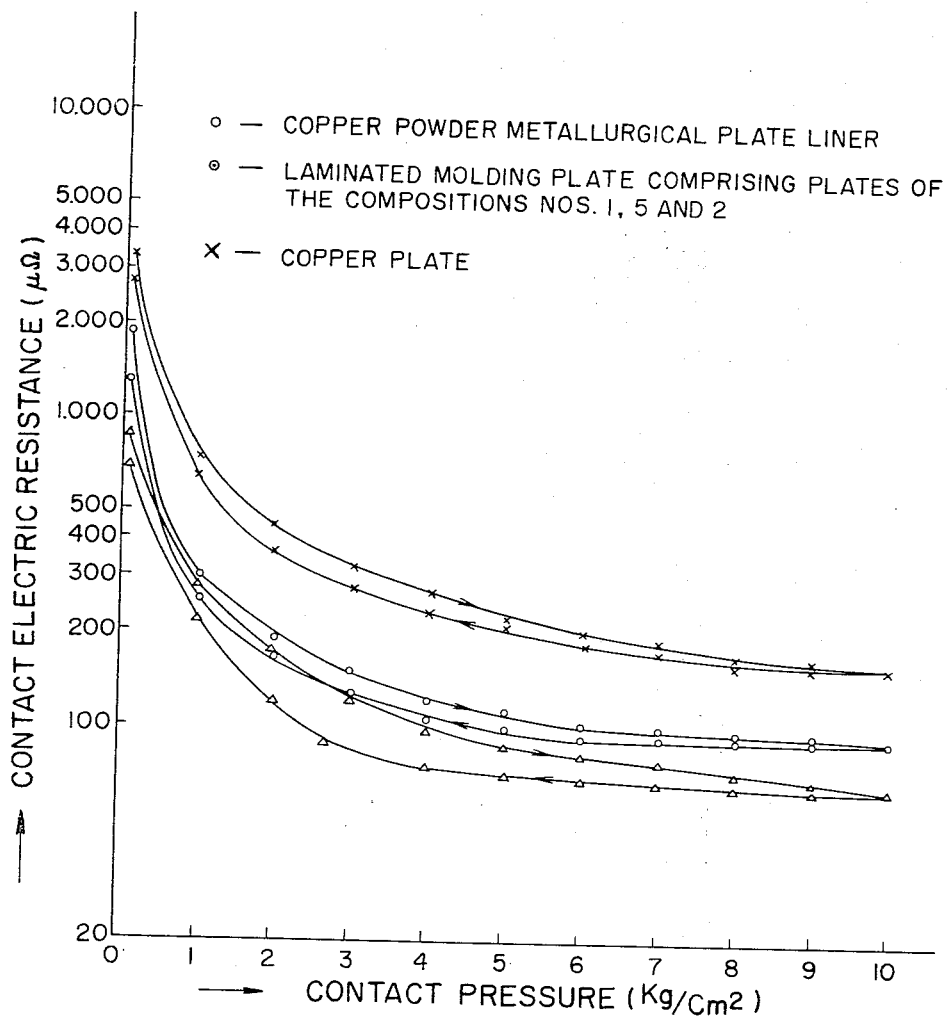

The porous powder metallurgical plate liner was manufactured by uniformly mixing the main component of metal powder, graphite powder, the additional metal powder and carbon fiber or graphite fiber in a predetermined amount as shown in the Table 3 and molding it to a desired form under the predetermined pressure and then sintering it at a certain temperature.

The compounding ratio of starting materials consists of 30 – 100 percent, preferably 80 – 95 percent by weight of at least one of metal powder selected from the group consisting of copper, iron and aluminum powders as the main component of metal powder, 0 – 50 percent, preferably 3 – 15 percent by weight of graphite powder, 0 – 30 percent, preferably 2 – 5 percent by weight of the additional metal powder and 0 – 3 percent, preferably 0.2 – 1.5 percent by weight of carbon fiber or graphite fiber on the weight basis of the powder metallurgical plate as shown in Table 3.

It is necessary to well mix carbon fiber or graphite fiber in metal powders so as to uniformly disperse through metal powders.

Although the molding conditions may vary depending on a kind of metal powder to be compounded and a compounding ratio, it is preferable to mold compounding metal powders to a desired form under the pressure of 1.5 to 8 metric ton/cm² and sinter it at the temperature of 500° to 1,250° C. for 15 – 180 minutes.

In the manufacture of the laminated article, it is preferable to laminate layers of metal powders having the compositions No. 1, No. 5 and No. 2 as shown in Table 3 in order, and then mold said layers to the desired form and sinter it under the conditions as mentioned above.

The particle size and the purity of metal powder to be compounded are shown as Tables 4 and 5.

TABLE 4.—PURITY AND PARTICLE SIZE OF METAL POWDER TO BE COMPOUNDED

|  | Main component | | | Graphite powder | Additional metal powder | Carbon or graphite fiber |
|---|---|---|---|---|---|---|
|  | Copper powder | Iron powder | Aluminum powder | | | |
| Purity | More than 98.5% | More than 97% | More than 98% | More than 85% | More than 98% | More than 90%. |
| Particle Size | Less than 1,000μ Less than 18 mesh [1] | Less than 1,000μ Less than 18 mesh | Less than 1,000μ Less than 18 mesh | Less than 1,000μ Less than 18 mesh | Less than 200μ Less than 70 mesh | Chip. |

[1] Tyler standard sieve.

TABLE 5

Characteristic value of carbon or graphite fiber (monofilament)

| | Characteristic Value | Shape |
|---|---|---|
| Specific gravity (gr/cc) | 1.4–2.0 | |
| Diameter ($\mu$) | 7–20 | |
| Diameter ($\mu$) | 7–20 | Clip |
| Tensile strength (kg/cm$^2$) | 6–25 | length |
| Elongation (%) | 0.3–1.8 | 2–15 m/m |

The additional metal powder to be compounded belong to Fe, Cu, Sn, Al, Pb, Zn, Mg, W, Mo, Co, Ta, Cr, Ti, Be, Ag, Mn, Cd and metallic oxide thereof.

It is preferable to combine and compound iron, copper, tin, aluminum; lead, zinc, magnesium; tungsten, molybdenum; cobalt, tantalum, chrom; titanium, beryllium; silver, manganese, cadmium as the additional metal powder.

It is preferable to select a round particle size of metal powder, a uniform particle form, a minimum pressure of molding press and such a sintering temperature as occurs a surface diffusion on metal powders in order to manufacture the porous powder metallurgical plate liner of this invention.

In view of that the contact surface between the liner and the holder is a curved one, if a curvature between the liner and the holder is different from each other by a minute, the copper plate liner will contact with the holder in some points or lines form thereby increasing the contact resistance of the electric current.

In case that the powder metallurgical plate liner is used instead of the copper plate liner as shown in FIG. 3, the contact electric resistance thereof is small in comparison with that of the copper plate liner while operating in spite of the porous structure thereof since the plate liner bears a large compressive deformation thereby maintaining a good contact by a clamping pressure of ordinary 5–30 kg/cm$^2$ in comparison with the copper plate owing to the porous structure of the liner.

FIG. 3 shows a characteristic feature of a compressive deformation of the copper powder metallurgical plate liner in comparison with that of the copper plate, taking a clamping pressure (kg/cm$^2$) in ordinate, and the compressive deformation of the copper powder metallurgical plate liner sintered on the copper plate in abscissa, in the curve plotted by the sign○; those of the copper powder metallurgical plate liner mixed carbon fiber therein, in the curve plotted by the sign Δ; those of the laminated liner molded from the copper powder metallurgical plates, in the curve plotted by the sign◎; those of the laminated liner (a dimension of sample of 40 mm × 20 mm × 10 mm) molded from the copper powder metallurgical plates mixed carbon fiber therein in the curve plotted the sign X.

Figure 4C:
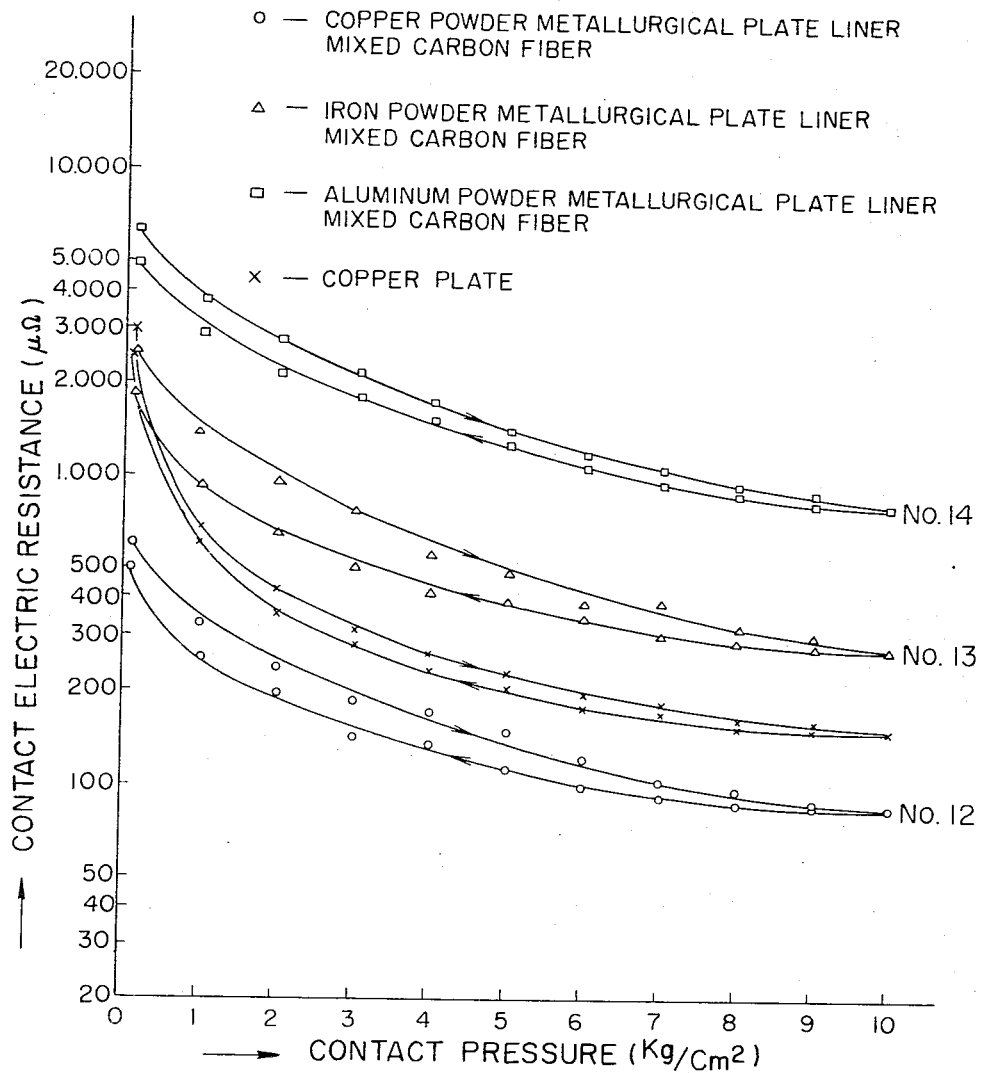

FIGS. 4a – 4c show measuring results relative to the interrelationship between the contact electric resistance and the clamping pressure of the powder metallurgical plate liners of this invention in the room temperature using the size of 80 mm × 10 mm taking the clamping pressure (kg/cm$^2$) in abscissa and the contact electric resistance ($\mu\Omega$) in ordinate in comparison with that of the copper plate shown in the curve plotted by the sign X.

FIG. 4a shows a characteristic feature of the interrelationship between the contact electric resistance and the clamping pressure of the copper powder metallurgical plate liner having the composition No. 2 in the curve plotted by the sign○; that of the aluminium powder metallurgical plate liner having the composition No. 3 in the curve plotted by the sign☐; that of the iron powder metallurgical plate liner having the composition No. 4 in the curve plotted by the sign Δ.

FIG. 4b shows a characteristic feature of the interrelationship between the contact electric resistance and the clamping pressure of the copper powder metallurgical plate liner having the composition No. 7 in the curve plotted by the sign ; that of the laminated molding plate (the combination of the plates having the composition Nos. 1, 5 and 2 in order) in the curve plotted by the sign Δ.

FIG. 4c shows a characteristic feature of the interrelationship between the contact electric resistance and the clamping pressure of the copper powder metallurgical plate liner mixed therein carbon fiber of the composition No. 12 in the curve plotted by the sign○; that of the iron powder metallurgical plate liner mixed therein carbon fiber of the composition No. 13 in the curve plotted by the sign Δ; and that of the aluminum powder metallurgical plate liner mixed therein carbon fiber of the composition No. 14 in the curve plotted by this sign☐.

The said experimental conditions correspond to those before the circular operation. In this case, it has found that the metal powder metallurgical plate liner except the copper powder metallurgical plate liner possess larger contact electric resistance than that of the copper plate owing to the inherent electric conductivity of metal.

Figure 5B:
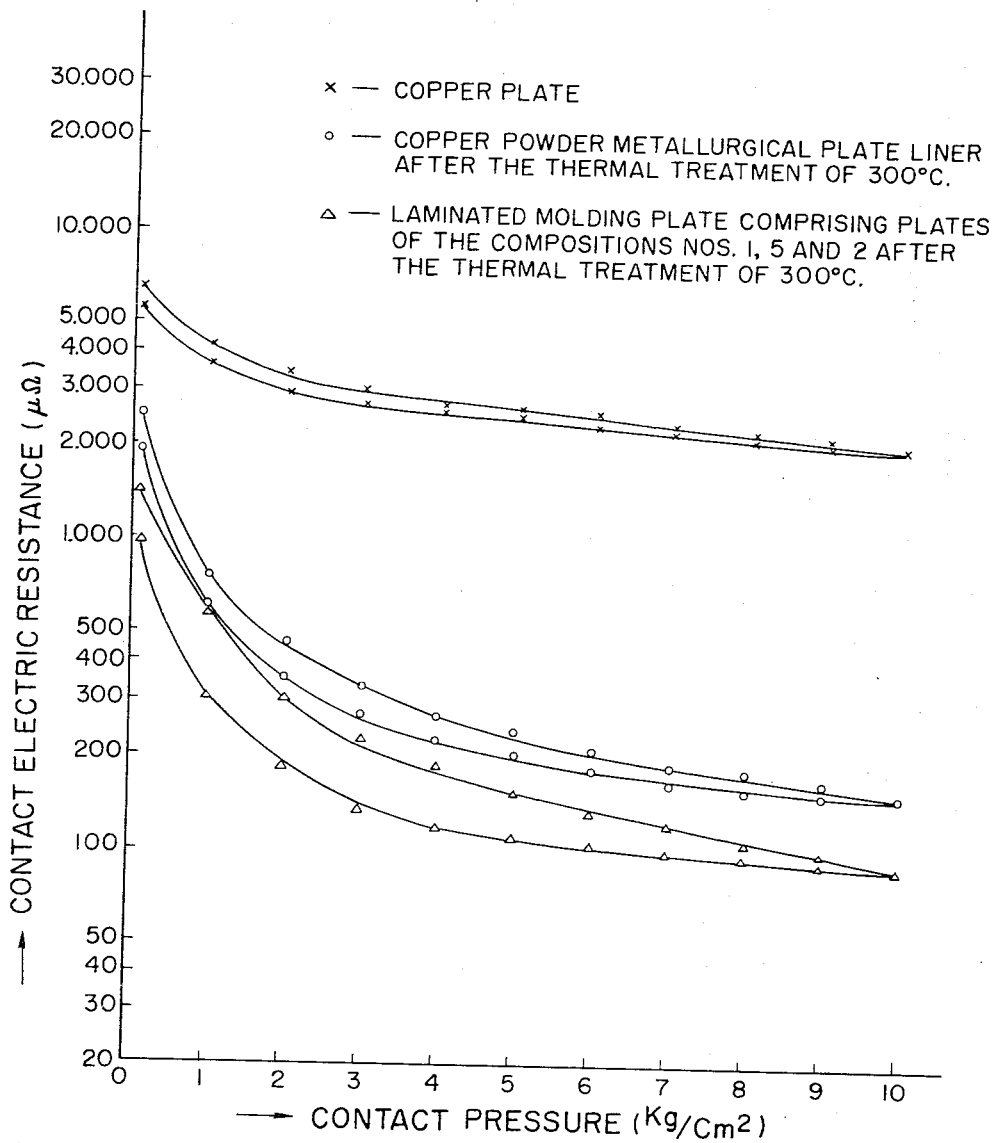
Figure 5C:
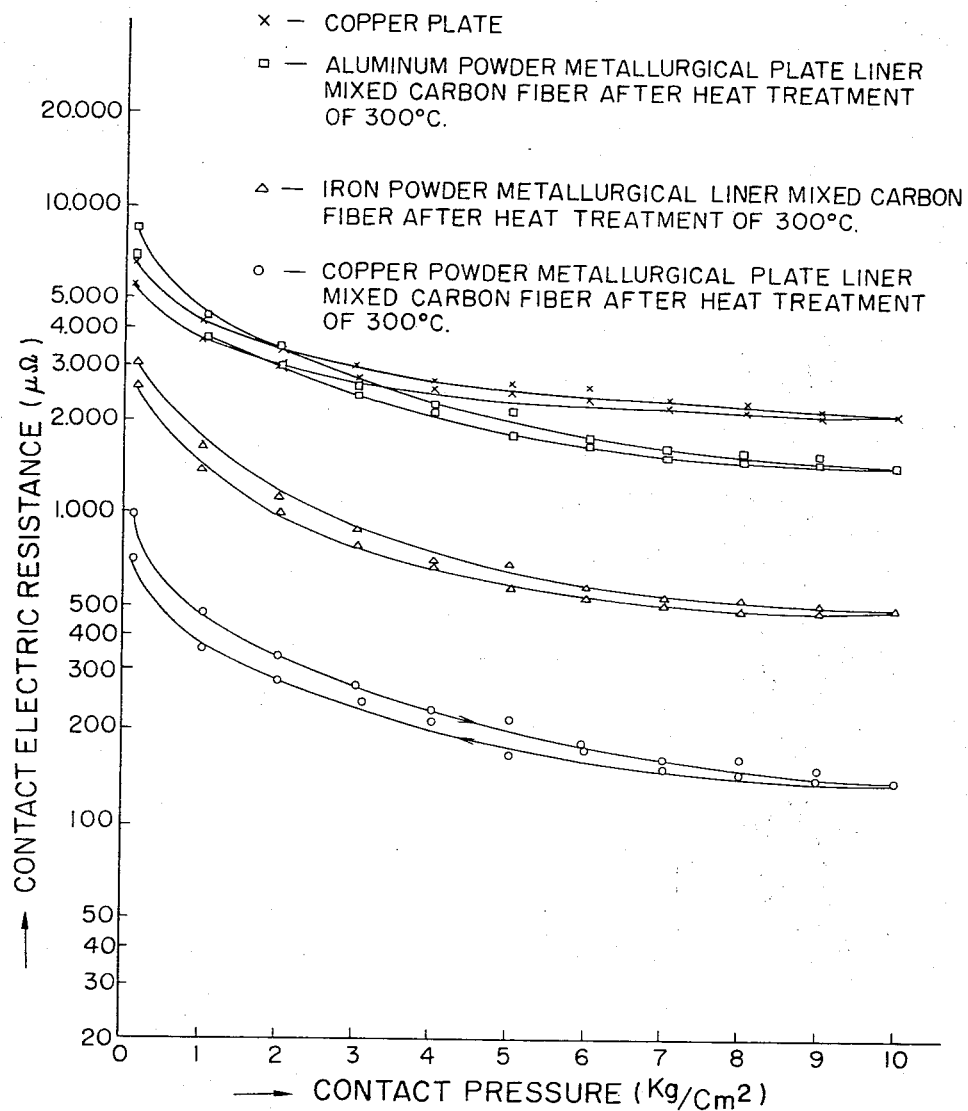

FIGS. 5a – 5c show the contact electric resistance of the samples shown in FIGS. 4a – 4c after the thermal treatment of 300° C. at the normal room temperature in comparison with the contact electric resistance of the corresponding samples untreated.

It has been found from the results obtained by FIGS. 5a – 5c that the contact electric resistance between the copper powder metallurgical plate liner and the graphite plate in a range of the clamping pressure of 5 – 30 kg/cm$^2$ is smaller than that of the copper plate liner in view of that the contact resistance between the copper plate liner and the graphite electrode is greatly effected with the formation of the oxide layer while that of the powder metallurgical plate liner is less effected with the formation of the oxide layer.

In the copper plate liner, it was necessary to minutely finish the surface of the copper plate liner, while in the powder metallurgical plate liner of this invention, the increasement of the contact resistance resulting from the bad contact between the liner and the graphite electrode may not occur even if not effecting any surface finishing of the liner since the pressure deformation of the holder is possible by means of the clamping pressure.

In the powder metallurgical plate liner, although the liner having the flat curved surface has been explained for convenience sake, a flat plate liner having vertical grooves, horizontal grooves or lattice-like grooves, can be used in a form of that sintered on one side or both sides of the metal base plate, or the laminated form. And also, if necessary, said powder metallurgical plate liner mixed with carbon fiber or graphite fiber can be used in the same way.

The contact surface area of the plate liner decreases by means of the groove working, but a pressure load per unit area will increase whereby the contact electric resistance of the liner becomes small, the bending of the liner becomes easy by the arrangement of the groove worked whereby the close adherence between the liner and the holder as well as the liner and the electrode may be improved.

As the resultant of the advantages as mentioned above, the working efficiency of the grooved liner as well as the flat plate liner may improve over that of the copper plate liner.

In the laminated molding plate liner comprising more than two of the powder metallurgical plates which are different from one another in the composition, it is an advantage that a strength is greatly improved and is easy to work in comparison with the powder metallurgical plate liner itself and that an adhesive property is greatly improved in comparison with that of the powder metallurgical plate itself owing to a low elasticity and a large compressive deformation.

In the above mentioned powder metallurgical plate liner uniformly mixed with carbon fiber or graphite fiber therein and the laminated powder metallurgical plate liner thereof, it is an advantage that a wear resisting property is greatly improved owing to increasing a bending strength and a heat conductivity, and that an usable life can be extended, while it is a disadvantage that a manufacturing cost is rather high by 20 – 30 percent owing to a complexity of the manufacturing process.

Figure 6A:
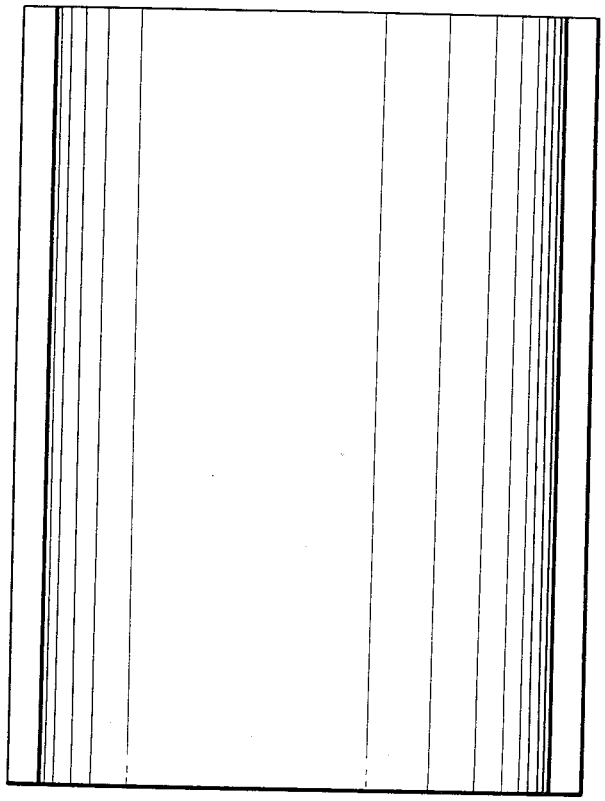
Figure 6B:
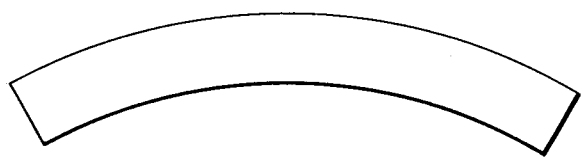
Figure 7A:
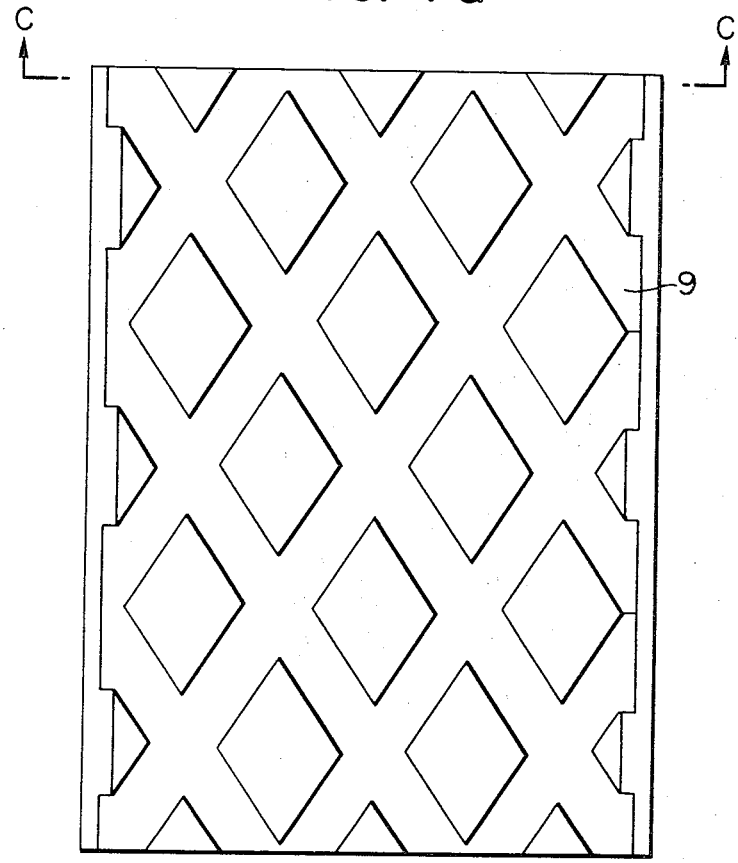
FIG. 7a is a front view of the liner of the powder metallurgical plate itself providing slanting checked pattern type grooves 9 on an inner curved surface 8.
Figure 7B:
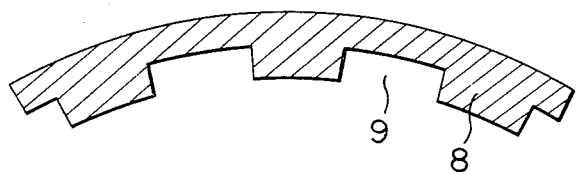
Figure 8A:
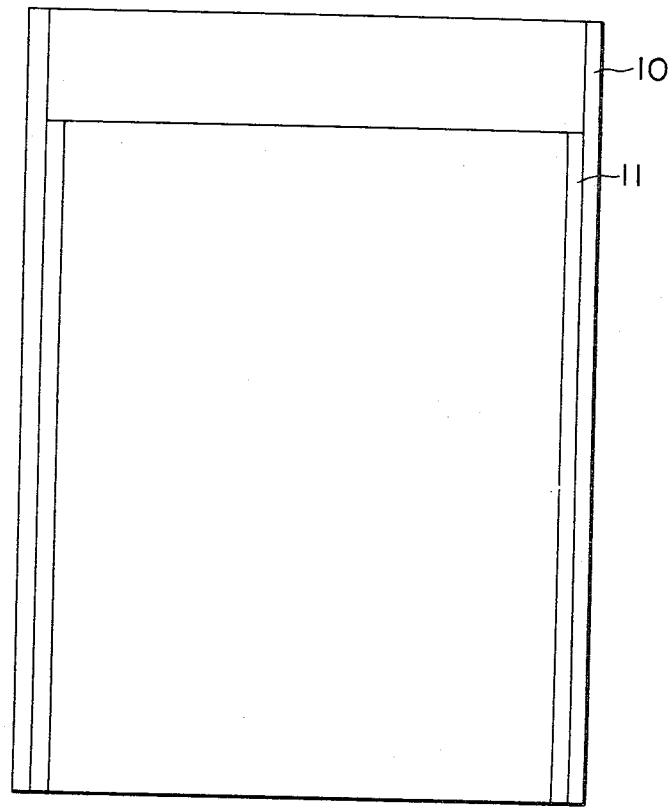
FIGS. 8a and 8b are a front view and a top view of the liner sintered on a side of the metal plate 10, the powder metallurgical plate 11 not providing any grooves respectively.
Figure 8B:
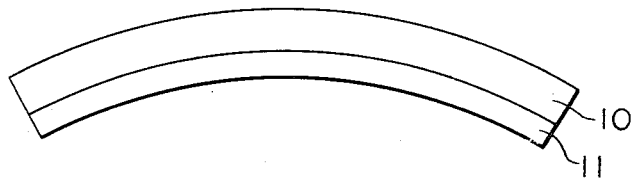
Figure 9A:
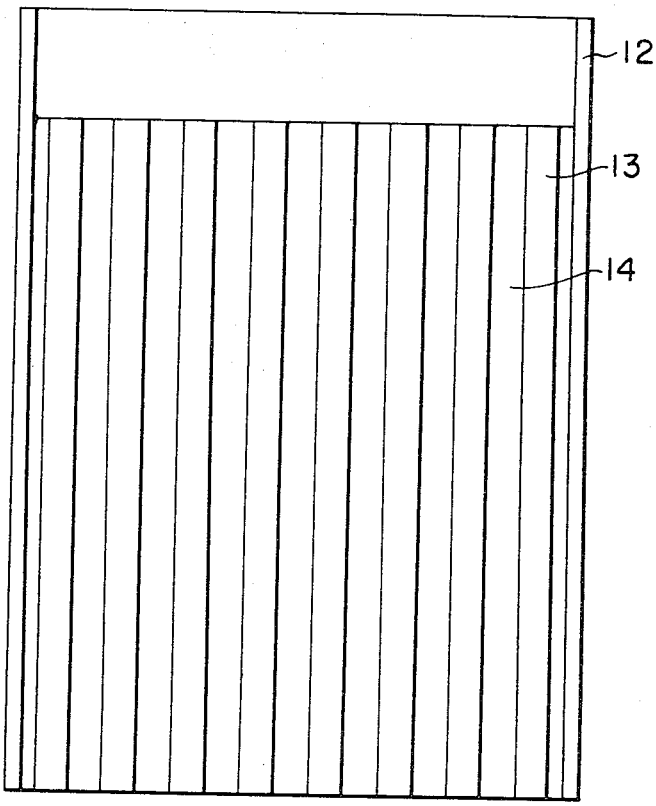
FIGS. 9a and 9b are a front view and top view of the liner sintered on a side of the metal plate 12, the powder metallurgical plate 13 providing vertical grooves 14 respectively.
Figure 9B:
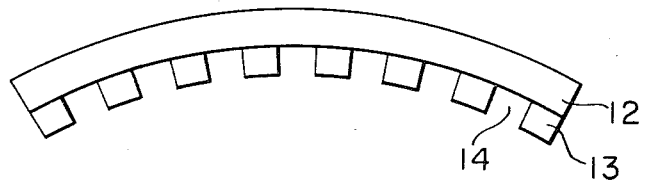
Figure 10A:
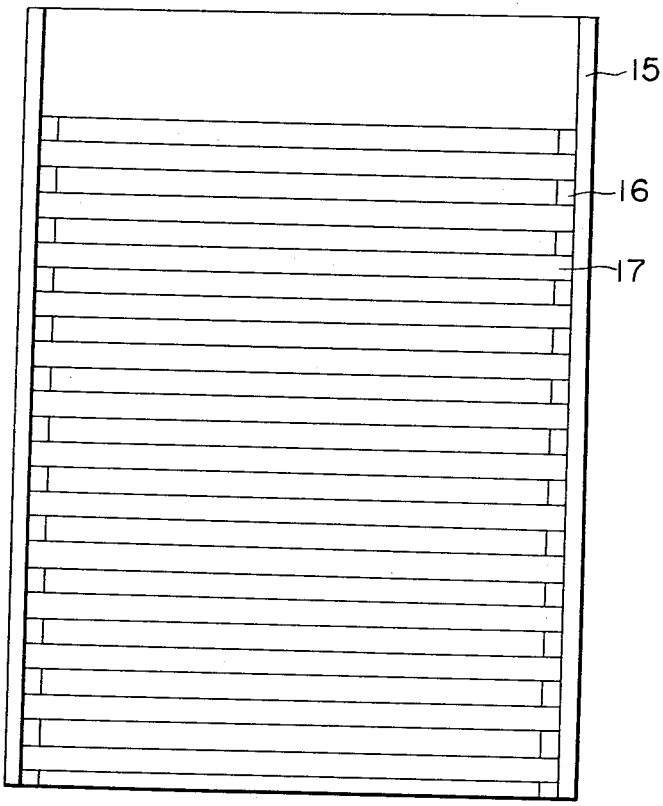
FIGS. 10a and 10b are a front view and a top view of the liner sintered on a side of the metal plate 15, the powder metallurgical plate 16 providing horizontal grooves 17 respectively.
Figure 10B:
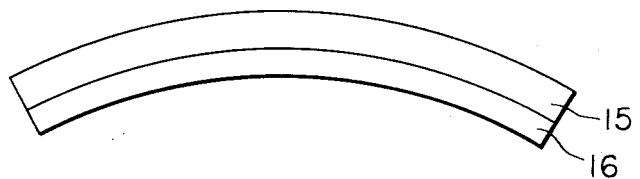
Figure 11A:
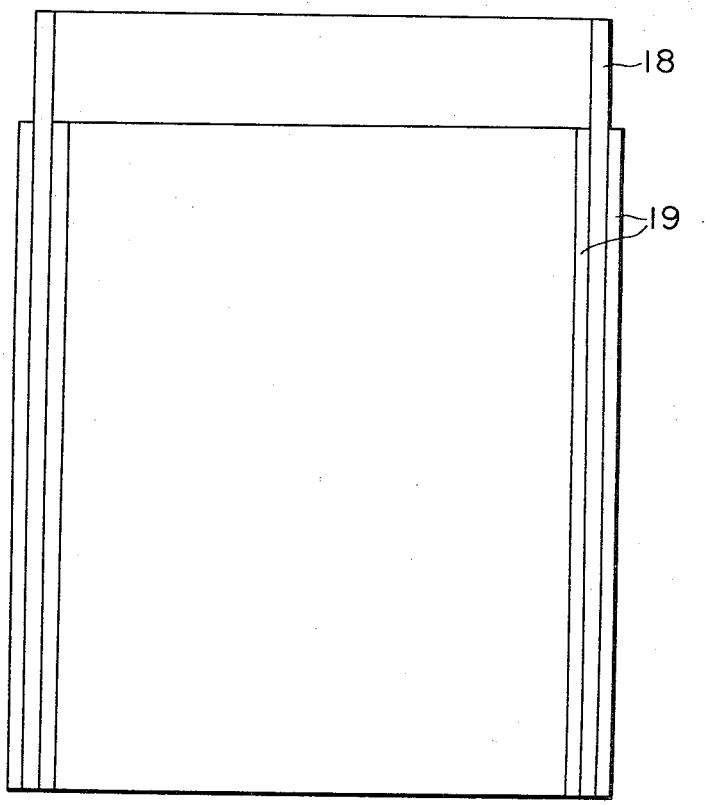
Figure 11B:
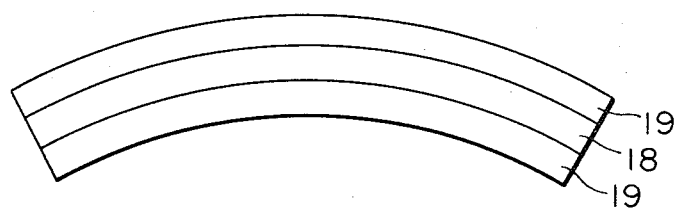
Figure 12A:
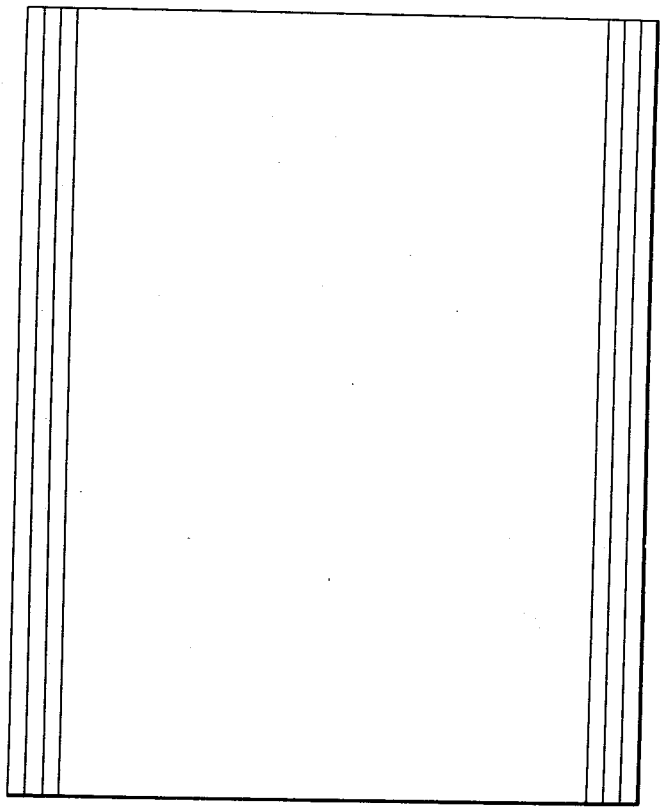
FIGS. 12a and 12b are a front view and a top view of the liner comprising the powder metallurgical plates laminated the powder metallurgical plates of the composition Nos. 1, 5 and 2 in order.
Figure 12B:
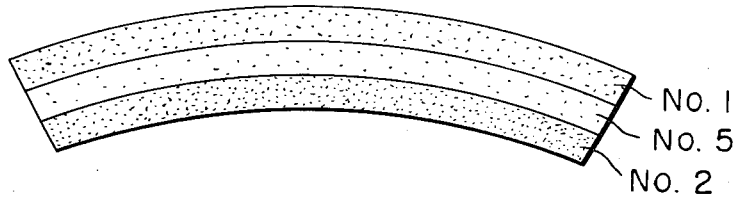

FIGS. 6a – 11b show various kinds of the powder metallurgical plate liner of this invention. FIGS. 6a and 6b show a front elevation and a plan elevation of the powder metallurgical plate liner not having any grooves respectively. FIG. 7a shows a front elevation of the liner 8 providing slanting lattice-like grooves 9 on the inner curved surface thereof. FIG. 7b shows the cross section of the liner along the line C—C of FIG. 7a. FIGS. 8a and 8b show a front elevation and an upper elevation of the liner sintered the powder metallurgical layer 11 not providing any grooves on one side of the metal plate 10 respectively. FIGS. 9a and 9b show a front elevation and an upper elevation of the liner sintered the powder metallurgical layer 13 providing longitudinal grooves 14 on one side surface of the metal plate 12 respectively. FIGS. 10a and 10b show a front elevation and an upper elevation of the liner sintered the powder metallurgical plate 16 providing the vertical grooves 17 on one side of the metal plate 15 respectively. FIGS. 11a and 11b show a front elevation and an upper elevation of the liner sintered the powder metallurgical layers 19 on the both surfaces of the metal plate 18 respectively. FIGS. 12a and 12b show a front elevation and an upper elevation of the laminated powder metallurgical plate liner comprising the powder metallurgical plate of compositions No. 1, 5 and 2 given in Table 3 in order.

The powder metallurgical plates as shown in the FIGS. 6a – 11b can be substituted with the laminated powder metallurgical plate.

Figure 13A:
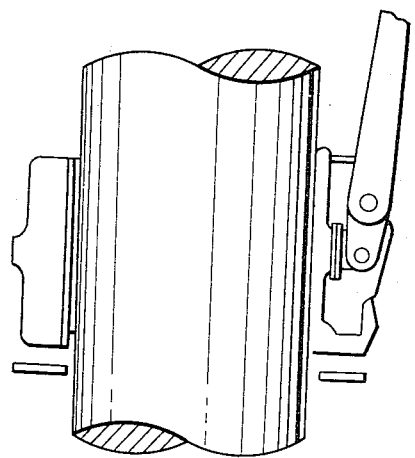
FIGS. 13a and 13b are the diagrammatical views of the electrode holder suitable for the application of the liner of the powder metallurgical plate as shown in FIGS. 6a – 12b burying therein.
Figure 13B:
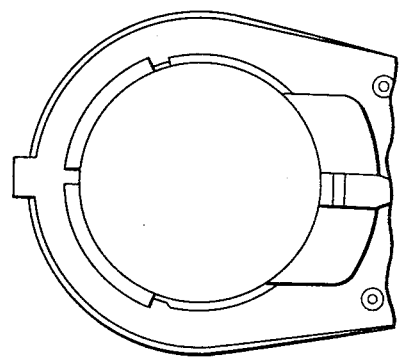

The liner comprising the powder metallurgical plates only as shown in FIGS. 6a – 12b can be used by means of the holder burying the liner therein as shown in FIG. 13.

The liner sintered the powder metallurgical plates on the base metal plate in a laminated form as shown in FIGS. 8a – 12b is applicable attaching to the holder as shown in FIG. 1.

The liner for the electrode holder of this invention will be explained by the following examples.

The periodical cycle for polishing a surface of the liner of this invention may extend to twice – 10 times of that of an ordinary copper plate liner even if the current density used exhibits an increase of 50 – 100 percent whereby a cycle of exchanging the liner positioned on an elevation under the high temperature may decrease and the outstanding effects of increasing a working efficiency and a safety as well as of an improvement of productivity and rationality may be obtained by means of continuously operating without any accident during working. The powder metallurgical plate liner does not need any finishing working which is an essential matter in the copper plate liner and the durable period of the powder metallurgical plate liner becomes long whereby an expense or cost consumed in the ordinary liner may be reduced by about 20 – 70 percent.

EXAMPLE 1

In an electric steel making furnace having a nominal capacity of 25 ton provided a transformer of the capacity of 7,500 KVA and 14 T type electrode of 350 mm diameter, the copper powder metallurgical plate liner not arranged both any grooves and any back plate of the composition No. 1 of Table 3 makes it possible to effect the continuous operation without any polishing treatment for 3 weeks (430 hrs) even if the current density increases to 30A/cm$^2$.

The laminated molded powder metallurgical plate liner without effecting any groove working and also having any back plate comprising the powder metallurgical plates of the compositions Nos. 1, 5 and 2 of Table 3 in order, makes it possible to effect the continuous operation without any polishing treatment for 4 weeks (570 hours) even if the current density increases to 30 A/cm$^2$.

The copper powder metallurgical plate liner mixed with carbon fiber without effecting any groove working and also having any back plate compositions No. 11 of Table 3, makes it possible to effect the continuous operation without any polishing treatment for 5 weeks (720 hours) even if the mean current density increases to 30 A/cm$^2$.

In the ordinary copper plate liner, it was necessary to practice the surface polishing treatment after the continuous operation for a week (144 hrs) in the means current density of 20 A/cm$^2$.

EXAMPLE 2

In the electric steel making furnace having the nominal capacity of 40 ton provided the transformer of the capacity of 12,500 KVA and 18 T type graphite electrode of 450 mm diameter, the copper powder metallurgical liner of the composition No. 2 of Table 3 provided longitudinal grooves and a copper back plate makes it possible to effect the continuous operation without any polishing treatment for 3 weeks (430 hrs) even if the electric current density increases to 35 A/cm$^2$.

The copper powder metallurgical plate liner having such the structure as shown in FIGS. 11a, 11b and without effecting any groove working comprising the copper powder metallurgical plate of the composition No. 2 of Table 3, makes it possible to effect the continuous operation without any polishing treatment for 4.5 weeks (640 hours) even if the current density increases to 35 A/cm².

The copper powder metallurgical plate liner having such the structure as shown in FIGS. 11a, 11b and without effecting any groove working comprising the copper powder metallurgical plate mixed with the graphite fiber of the composition No. 12 of Table 3, makes it possible to effect the continuous operation without any polishing treatment for 5.5 weeks (790 hours) even if the current density increases to 52 A/cm² using the transformer having the nominal capacity of 26,400 KVA.

While it was necessary to practice the surface polishing treatment of the liner after a lapse of a week (144 hrs) in the mean current density of 25 A/cm².

EXAMPLE 3

In the electric steel making furnace having the nominal capacity of 25 ton providing the transformer of the capacity of 7,500 KVA and 14 T type electrode of 350 mm diameter, the aluminum powder metallurgical plate liner not arranging any grooves of the composition No. 3 of Table 3 makes it possible to effect the continuous operation without any polishing treatment for 2 weeks (288 hrs) even if the electric current density increases to 30 A/cm².

The aluminum powder metallurgical plate liner laminated having such the structure as shown in FIGS. 12a, 12b and without effecting any groove working comprising the aluminum powder metallurgical layers of the composition Nos. 3, 8 and 3 of Table 3 in order, makes it possible to effect the continuous operation without any polishing treatment for 3 weeks (430 hours) even if the current density increases 30 A/cm².

The aluminum powder metallurgical plate liner having such the structure as shown in FIGS. 11a, 11b and without effecting any groove working comprising the aluminum powder metallurgical plate mixed with carbon fiber of the composition No. 14 of Table 3, makes it possible to effect the continuous operation without any polishing treatment for 4 weeks (570 hours) even if the current density increases to 30 A/cm².

While in the ordinalry copper plate liner, it was necessary to practice the surface polishing treatment of the liner after a lapse of a week (144 hrs.) even if the mean electric current density reaches to a value of 20 A/cm².

EXAMPLE 4

In the electric steel making furnace having the nominal capacity of 40 ton providing the transformer of the capacity of 125,000 KVA and 18 T type of the graphite electrode of 450 mm diameter, the iron powder metallurgical liner having the composition No. 4 of Table 3 and without effecting any groove working thereon makes it possible to effect the continuous operation without any polishing treatment for 3 weeks (430 hrs) even if the current density reaches to 35 A/cm².

The iron powder metallurgical plate liner laminated having such the structure as shown in FIGS. 12a, 12b and without effecting any groove working comprising the iron powder metallurgical plates of the composition Nos. 4, 5 and 4 of Table 3 in order, makes it possible to effect the continuous operation without any polishing treatment for 4 weeks (570 hours) even if current density increases to 52 A/cm² using the transformer having the nominal capacity of 26,400 KVA.

The iron powder metallurgical plate liner having such the structure as shown in FIGS. 12a, 12b and without effecting any groove working comprising the iron powder metallurgical plate mixed with carbon fiber of the composition No. 13 of Table 3 therein, makes it possible to effect the continuous operation without any polishing treatment for 5 weeks (720 hours) even if the current density increases to 52 A/cm² using the transformer having the nominal capacity of 26,400 KVA.

While in the ordinary copper plate liner, it was necessary to practice the surface polishing treatment of the liner after the continuous operation of a week (144 hrs) even if the mean current density reaches the value of 25 A/cm².

TABLE 3  The composition of power metallurgical plrte liner and the properties thereof

| I. Powder metallurgical liner of this invention | | Compound ratio, percent weight | Porosity, percent | Relative resistance, $\mu\Omega$, cm. | Modulus of elasticity, kg./cm.² | Tensile strength, kg./cm.² | Coefficient of heat expansion $\times 10^{-6}/°$ C. | Contact resistance (A) $\mu\Omega$ | (B) $\mu\Omega$ |
|---|---|---|---|---|---|---|---|---|---|
| 1 | Copper powder | 93 | 10 | 2.5 | 5,800 | 9 | 19 | 120 | 200 |
|   | Graphite powder | 5 | | | | | | | |
|   | Tin powder | 2 | | | | | | | |
| 2 | Copper powder | 82 | 11 | 5.5 | 3,700 | 2.5 | 17 | 100 | 180 |
|   | Graphite powder | 15 | | | | | | | |
|   | Zinc powder | 3 | | | | | | | |
| 3 | Aluminum powder | 86 | 25 | 7 | 3,000 | 2 | 2.5 | 1,000 | 1,800 |
|   | Graphite powder | 10 | | | | | | | |
|   | Zinc powder | 4 | | | | | | | |
| 4 | Iron powder | 75 | 20 | 17 | 6,500 | 8 | 15 | 370 | 610 |
|   | Copper powder | 20 | | | | | | | |
|   | Graphite lead powder | 5 | | | | | | | |
| 5 | Copper powder | 100 | .5 | 2 | 8,000 | 15 | 18 | 130 | 300 |
| 6 | Iron powder | 100 | 10 | 19 | 7,000 | 12 | 13 | 400 | 800 |
| 7 | Copper powder | 80 | 15 | 10 | 3,200 | 2 | 17 | 90 | 150 |
|   | Graphite powder | 20 | | | | | | | |
| 8 | Aluminum powder | 92 | 22 | 6 | 3,100 | 2.7 | 23 | 900 | 2,000 |
|   | Graphite powder | 8 | | | | | | | |
| 9 | Copper powder | 40 | 23 | 12 | 3,600 | 3.6 | 23 | 450 | 840 |
|   | Iron powder | 30 | | | | | | | |
|   | Aluminum powder | 10 | | | | | | | |
|   | Graphite powder | 15 | | | | | | | |
|   | Tin powder | 5 | | | | | | | |
| 10 | Copper powder | 30 | 27 | 16 | 4,200 | 6 | 20 | 630 | 910 |
|   | Iron powder | 40 | | | | | | | |
|   | Aluminum powder | 10 | | | | | | | |
|   | Tin powder | 10 | | | | | | | |
|   | Graphite powder | 10 | | | | | | | |

TABLE 3 — Continued

| I. Powder metallurgical liner of this invention | | Compound ratio, percent weight | Porosity, percent | Relative resistance, μΩ, cm. | Modulus of elasticity, kg./cm.² | Tensile strength, kg./cm.² | Coefficient of heat expansion x10⁻⁶/° C. | Contact resistance (A) μΩ | Contact resistance (B) μΩ |
|---|---|---|---|---|---|---|---|---|---|
| 11 | Copper powder | 85 | 18 | 5 | 3,400 | 6 | 16 | 100 | 150 |
|  | Graphite powder | 14.5 | | | | | | | |
|  | Carbon fiber | 0.5 | | | | | | | |
| 12 | Copper powder | 89 | 15 | 4 | 3,600 | 9 | 16 | 95 | 140 |
|  | Graphite powder | 10 | | | | | | | |
|  | Graphite fiber | 1 | | | | | | | |
| 13 | Iron powder | 70 | 25 | 18 | 5,800 | 6 | 15 | 280 | 500 |
|  | Copper powder | 15 | | | | | | | |
|  | Graphite powder | 8.5 | | | | | | | |
|  | Zinc powder | 5 | | | | | | | |
|  | Carbon fiber | 1.5 | | | | | | | |
| 14 | Aluminum powder | 85 | 24 | 10 | 2,800 | 4 | 28 | 830 | 1,400 |
|  | Zinc powder | 5 | | | | | | | |
|  | Magnesium powder | 1 | | | | | | | |
|  | Graphite powder | 8 | | | | | | | |
|  | Carbon fiber | 1 | | | | | | | |
| II. Metal plate for a comparative test | | | | | | | | | |
|  | Copper powder | | 0 | 1.7 | 12,000 | 20 | 17 | 150 | 2,100 |
|  | Aluminum powder | | 0 | 2.8 | 7,300 | 8 | 25 | 1,300 | |
|  | Iron powder | | 0 | 10.0 | 20,000 | 25 | 12 | 450 | |

NOTE.—
(1) Coefficient of the heat expansion was measured at a temperature of 20~300° C.
(2) The contact resistance (A) μΩ was measured at a room temperature by contacting a test piece of plane plate having 40 cm.² in an area with graphite plate under the pressure of 10 kg./cm.².
(3) The contact resistance (B) μΩ was measured at the room temperature by contacting a test piece of plane plate having 40 cm.² in an area with graphite at 300° C. under the pressure of 10 kg./cm.².

We claim:

1. An electrode holder for a graphite electrode of an electric arc furnace, said electrode holder having a liner having a surface that is adapted to engage and conform to the surface of the electrode and said liner comprising a porous, sintered, powder metallurgical member comprising from 30 to 100 percent by weight of metal powder selected from the group consisting of copper, iron and aluminum powders and mixtures thereof, from 0 to 50 percent by weight of graphite powder, from 0 to 30 percent by weight of an additional metal powder selected from the group consisting of tin, lead, zinc, magnesium, tungsten, molybdenum, cobalt, tantalum, chromium, titanium, beryllium, silver, manganese and cadmium powders and mixtures thereof, and from 0 to 3 percent by weight of at least one of the group consisting of carbon fiber and graphite fiber and mixtures thereof.

2. An electrode holder for a graphite electrode of an electric arc furnace, said electrode holder having a liner having a surface that is adapted to engage and conform to the surface of the electrode and said liner comprising a porous, sintered, powder metallurgical member comprising from 80 to 95 percent by weight of metal powder selected from the group consisting of copper, iron and aluminum powders and mixtures thereof, from 3 to 15 percent by weight of graphite powder, from 2 to 5 percent by weight of an additional metal powder selected from the group consisting of tin, lead, zinc, magnesium, tungsten, molybdenum, cobalt, tantalum, chromium, titanium, beryllium, silver, manganese and cadmium and mixtures thereof and from 0.2 to 1.5 percent by weight of a material selected from the group consisting of carbon fiber and graphite fiber and mixtures thereof.

3. An electrode holder according to claim 1 having a solid metal plate as a base and a porous, powder metallurgical liner sintered on one side thereof.

4. An electrode holder according to claim 1 having a solid metal plate as a base with a porous outer metallurgical liner sintered on both sides thereof.

5. An electrode holder according to claim 1 wherein the liner comprises two or more porous, powder metallurgical members laminated together.

6. A process for manufacturing electrode holders for the graphite electrodes of electric arc furnaces including the steps of mixing from 80 to 95 percent by weight of metal powder selected from the group consisting of copper, iron and aluminum powders and mixtures thereof, from 3 to 15 percent by weight of graphite powder, from 2 to 5 percent by weight of an additional metal powder selected from the group consisting of tin, lead, zinc, magnesium, tungsten, molybdenum, cobalt, tantalum, chromium, titanium, beryllium, silver, manganese and cadmium powders and mixtures thereof, and from 0.2 to 1.5 percent by weight of a material selected from the group consisting of carbon fiber and graphite fiber and mixtures thereof, molding the mixed powders to a desired form at a pressure of 1.5 to 8 metric tons per square centimeter and then sintering the molded member at a temperature of from 500° to 1,250° C. to provide a porous, conductive structure.

* * * * *

PO-1050
(5/69)

UNITED STATES PATENT OFFICE
CERTIFICATE OF CORRECTION

Patent No. 3,717,445                Dated February 20, 1973

Inventor(s) Tsueno Yoshimura, Kunio Suzuki and Gohei Shikano

It is certified that error appears in the above-identified patent and that said Letters Patent are hereby corrected as shown below:

Column 5, Table 5, line 9, change "clip" to --chip--.

Column 6, line 13, after "sign" and before the semi-colon, the designation sign -- $O$ -- should be inserted.

Columns 9 and 10, Table 3, In the title of the Table, change "power" to --powder-- and "plrte" to --plate--.

Signed and sealed this 3rd day of July 1973.

(SEAL)
Attest:

EDWARD M. FLETCHER, JR.  Rene Tegtmeyer
Attesting Officer  Acting Commissioner of Patents